United States Patent [19]

Vaughan et al.

[11] 4,242,026
[45] Dec. 30, 1980

[54] SELF-UNLOADING SHIP WITH SUSPENDED RECLAIM SCRAPER

[75] Inventors: Warren R. Vaughan, Markham; Matthieu Suykens, Plainfield, both of Canada

[73] Assignee: Allis-Chalmers Canada, Limited, Lachine, Canada

[21] Appl. No.: 939,781

[22] Filed: Sep. 5, 1978

[51] Int. Cl.³ .............................................. B63B 27/20
[52] U.S. Cl. .................................... 414/145; 414/305; 414/133
[58] Field of Search ............... 414/145, 143, 144, 140, 414/158, 211, 214, 277, 317, 523, 133, 285, 298, 305; 198/511, 512, 514, 519, 520, 518, 862, 863, 516, 950

[56] References Cited

U.S. PATENT DOCUMENTS

| | | | |
|---|---|---|---|
| 1,585,268 | 5/1926 | Sensibar | 414/145 |
| 2,750,023 | 6/1956 | Meissner | 414/133 X |
| 3,144,142 | 8/1964 | Wallace, Jr. | 414/145 |
| 3,384,248 | 5/1968 | Leitch et al. | 414/133 X |
| 4,072,238 | 2/1978 | Vaughan | 414/145 |
| 4,146,144 | 3/1979 | Johansson | 414/144 X |

*Primary Examiner*—Frank E. Werner
*Attorney, Agent, or Firm*—Charles L. Schwab

[57] ABSTRACT

A material handling system for continuous reclaiming or unloading of bulk cargo from the "dead flow" regions of a ship hold. An unloading conveyor is positioned in underlying relation to the hold substantially centrally of the transverse dimension of the hold and moves lengthwise of the hold. The bottom of the hold is provided with gated discharge hoppers in overlying and discharging relation to the unloading conveyor. A suspended reclaim scraper is provided on each of the opposite lateral sides of the longitudinal axis of the ship hold to transfer bulk material laterally from the respective "dead flow" regions to the centrally located discharge hoppers and thus to the underlying unloading conveyor. Each reclaim scraper is suspended by a cable hoist system from a suspension head carried by a trolley which is traversible lengthwise of the hold along a track positioned in the upper portion of the hold, whereby to traverse the reclaim scraper longitudinally of the hold. The track extends in overlying relation to a plurality of holds through an aperture or apertures extending through the bulkhead or bulkheads separating the plurality of holds. The cable hoist system provides the upward or downward movement of the reclaim scraper. Mechanism is also provided for "slewing" the suspension head and the reclaim scraper supported thereby through an angle of 90° in a horizontal plane to permit movement of the suspended reclaim scraper through the aperture in the upper portion of a bulkhead from one hold to an adjacent hold.

7 Claims, 15 Drawing Figures

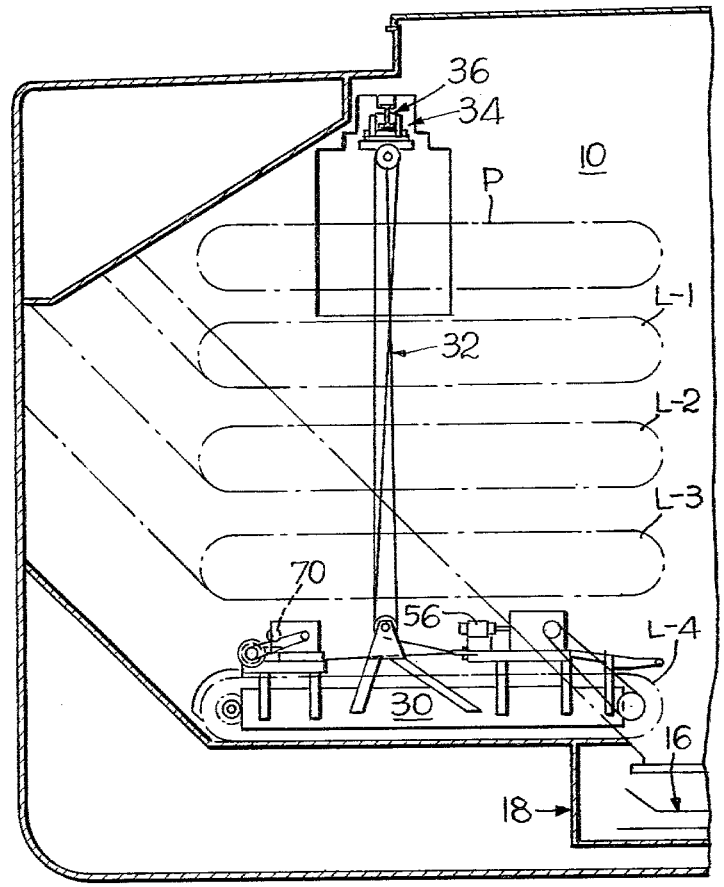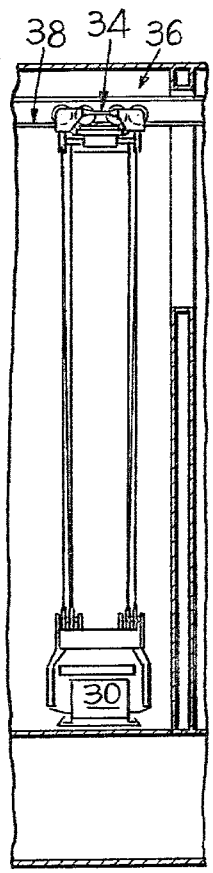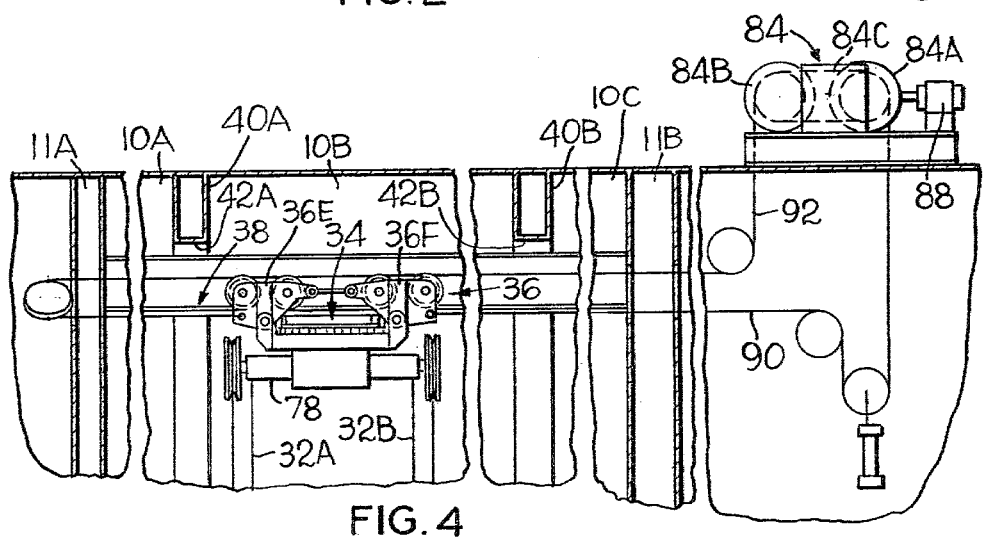
FIG. 2
FIG. 3
FIG. 4

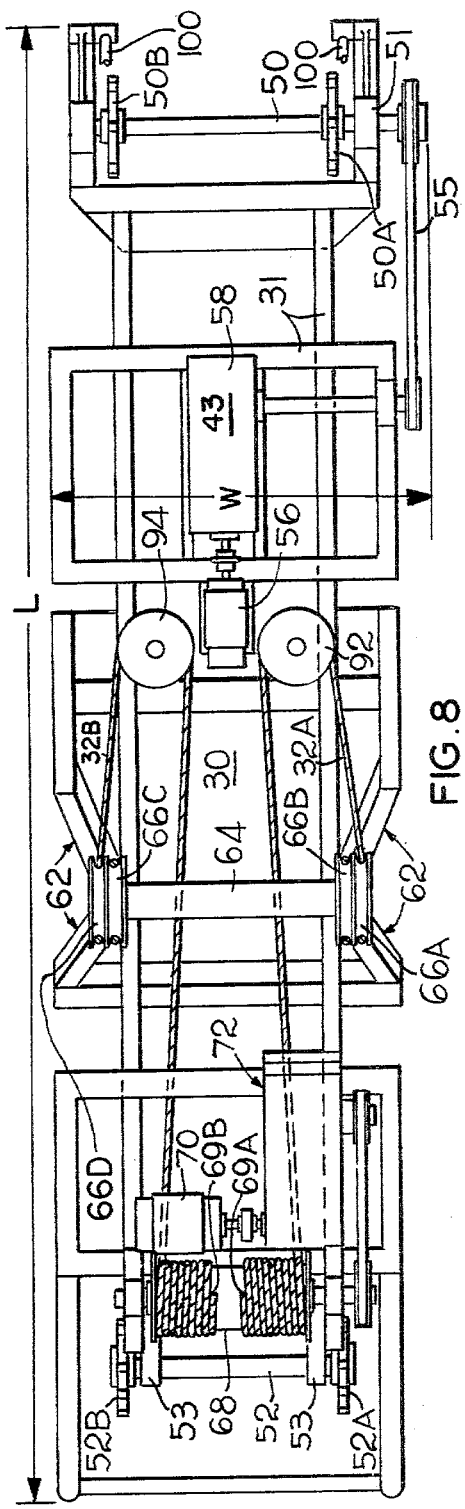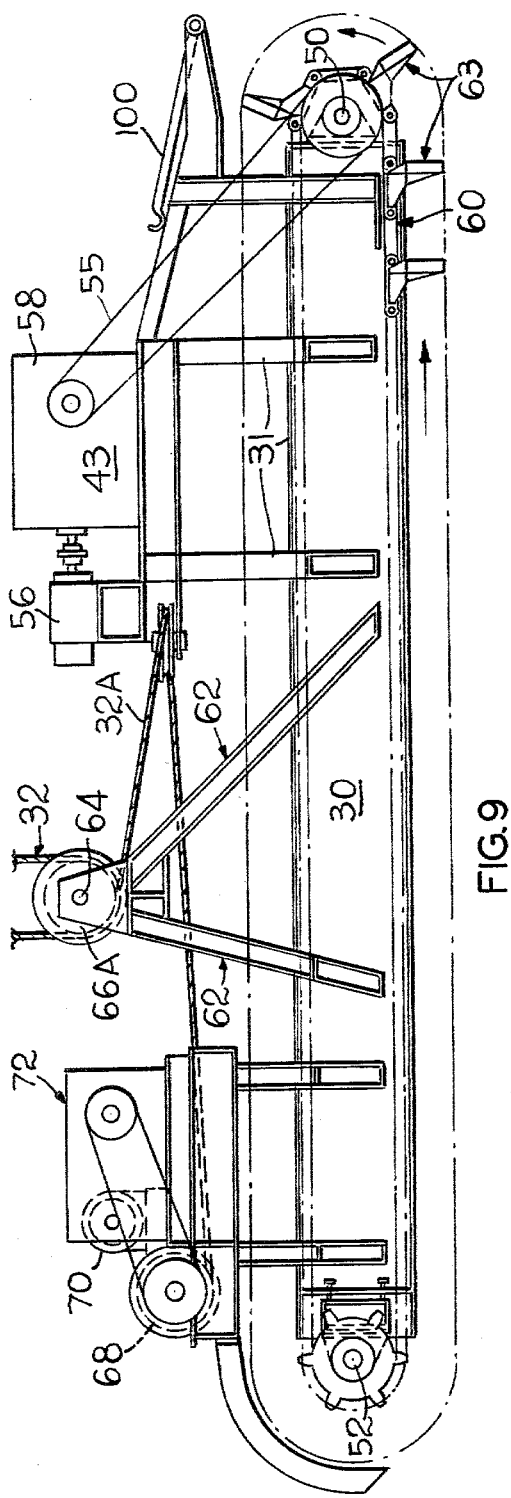
FIG. 8
FIG. 9

SELF-UNLOADING SHIP WITH SUSPENDED RECLAIM SCRAPER

TECHNICAL FIELD

This invention relates to a system and apparatus for reclaiming or removing bulk material from the hold of a bulk cargo ship, and more particularly to a system and apparatus of the type just mentioned which utilizes a suspended reclaim scraper which is mounted by a cable hoist system for downward and upward vertical movement and which is also adapted to be longitudinally traversed along the length of the hold, as well as for movement through a bulkhead from one hold to another hold.

DESCRIPTION OF THE PRIOR ART

Bulk cargo vessels for transporting coal, iron ore, grain, salt, crushed stone or the like, are sometimes provided with one or more tunnel belt unloading conveyors in the lower portion of the ship in underlying relation to the hold or holds of the ship and which run in a direction longitudinally of the ship. Such an arrangement is shown, for example, by U.S. Pat. No. 4,072,238 of Warren R. Vaughan, one of the joint inventors on the present patent application, which shows a self-unloading ship having two tunnel belt conveyors in underlying relation to the bottom of the ship holds and running in a direction longitudinally of the ship holds contiguous opposite lateral sides of the ship holds.

When the ship is provided with a single tunnel belt unloading conveyor which is located in underlying relation to the ship hold substantially centrally of the transverse dimension of the ship hold and running in a direction lengthwise of the hold, the portion of the bulk material which is located in a generally central region of the hold (relative to the transverse dimension of the hold) and in overlying relation to the tunnel belt conveyor, flows by gravity downwardly to the tunnel belt unloading conveyor which conveys such material either alone or in cooperation with another conveyor or conveyors to some desired unloading location, such as to a dockside conveyor or other suitable collecting means.

A problem which is encountered in the unloading of bulk material from a ship hold provided with a single centrally located tunnel belt unloading conveyor, as just described, to which the bulk material lying in a centrally located region falls by gravity is the fact that there are "dead flow" regions of the ship's hold lying on laterally opposite sides of the aforesaid centrally located region of the hold and the bulk material in these "dead flow" regions does not flow by gravity to the centrally located tunnel belt unloading conveyor.

It is known in the prior art as shown by U.S. Pat. No. 3,847,290, issued to Mattieu Suykens, one of the joint inventors on the present patent application, to provide an apparatus for reclaiming bulk material from hold of a ship including a plurality of side-by-side bucket elevators which are pivotally mounted so as to follow the level of the bulk material from the top to the bottom of the hold. The bucket elevators of the prior art patent just mentioned are pivotally supported by a trolley frame which can be moved longitudinally of the ship hold to permit removing of bulk material along the entire length of the ship hold.

A further problem which is encountered in prior art arrangements for unloading or reclaiming bulk material from the hold of a bulk cargo vessel, including the arrangement of the Suykens patent just mentioned, is that such prior art unloading arrangements could not generally be used to remove bulk material from along the entire length of the bulk cargo containing region of the ship when the ship is provided with bulkheads separating the bulk cargo containing region into a plurality of holds.

While the aforementioned U.S. Pat. No. 4,072,238 of Warren R. Vaughan shows a reclaimer which moves along the floors of the holds longitudinally of the ship and may pass through doors in the lower portion of the transverse walls or bulkheads separating one hold from another, such an arrangement would not be practical for use with the suspended reclaim scraper disclosed in the present invention.

A literature reference of interest in connection with the use of reclaiming scrapers for reclaiming or unloading bulk material is an article entitled "The Reclaiming Scraper—A Versatile Unit" by Kurt Kamm, published by Pohlig-Heckel-Bleichert-Vereinigte Machinenfabriken A.G., Cologne, West Germany.

STATEMENT OF THE INVENTION

Accordingly, it is an object of the present invention to provide an improved system and apparatus for removing or reclaiming bulk material from the hold of a bulk cargo ship.

It is another object of the invention to provide a system and apparatus for unloading or reclaiming bulk material from the "dead flow" regions of the hold of a bulk cargo ship.

It is a further object of the invention to provide a system and apparatus for reclaiming bulk material from the hold of a bulk cargo vessel in which the reclaiming system and apparatus includes a suspended reclaim scraper which is mounted by a cable hoist system for downward and for upward vertical movement and which is also mounted for traversing movement longitudinally of the ship hold.

It is a further object of the invention to provide a system and apparatus for unloading or reclaiming bulk material from the hold of a bulk cargo vessel in which the reclaiming apparatus is adapted for use with a ship having a bulk cargo containing region which is separated into a plurality of holds by a bulkhead or bulkheads.

It is a further object of the invention to provide a system and apparatus for unloading or reclaiming bulk material from a ship of the type in which the bulk cargo containing region of the ship is separated into a plurality of holds by one or more bulkheads, and in which the suspension system for the reclaim scraper is constructed to permit "slewing" of the reclaim scraper through an angle of 90° from its normal operating position to permit longitudinal traversing movement of the suspended reclaim scraper through an opening in the bulkhead partition from one hold to an adjacent hold.

It is still a further object of the invention to provide an apparatus for removing or reclaiming bulk material from the hold of a bulk cargo vessel which is less expensive than prior art bulk material reclaiming apparatus.

In achievement of these objectives, there is provided in accordance with the invention a material handling system for continuous unloading of bulk cargo from the hold of a ship in which a bulk cargo unloading conveyor is positioned in underlying relation to said hold and moves in a direction lengthwise of the ship, and discharge passage means at the bottom of said hold along the length of said hold through which bulk material may discharge onto said unloading conveyor, comprising a reclaim scraper positioned in said hold for reclaiming bulk material from said hold, said reclaim scraper comprising movable bulk material transfer means adapted to engage the bulk material and to transfer the bulk material to said discharge passage means, means for driving said material transfer means to effect the transfer of said bulk material, track means mounted contiguous the upper end of said hold and extending longitudinally of said hold, support means mounted for translatory movement along said track means lengthwise of said hold, cable hoist means interconnecting said support means and said reclaim scraper and operable to lower said reclaim scraper into reclaiming relation to bulk material in said hold and to raise said reclaim scraper, and means for moving said support means along said track, whereby to move said reclaim scraper lengthwise of said hold to permit reclaiming of bulk material lying along the length of said hold. Further aspects of the invention as defined by dependent claims recite that the track means extends through a passage in the bulkhead from one hold to another hold, and that means is provided for angularly rotating the suspended reclaim scraper through a 90° angle in a horizontal plane from its normal orientation transverse of the longitudinal axis of the hold to permit movement of the suspended reclaim scraper through the passage in bulkhead from one hold to an adjacent hold.

BRIEF DESCRIPTION OF THE DRAWINGS

Further objects and advantages of the invention will become apparent from the following description taken in conjunction with the accompanying drawings in which:

FIG. 2 is a view in transverse cross section of one transverse half of the ship hold showing the suspended reclaim scraper of the invention in various positions which it may assume in the hold;

FIG. 3 is a view in end elevation of the apparatus shown in FIG. 2;

FIG. 4 is a fragmentary view in longitudinal elevation showing the longitudinally extending track along which the trolly from which the reclaim scraper is suspended moves in its longitudinal traversing movement and also showing the suspension head for the reclaim scraper, and the double winch system for longitudinally traversing the trolley;

FIG. 8 is a top plan view of the reclaim scraper;

FIG. 9 is a view in front elevation of the reclaim scraper of FIG. 8;

DETAILED DESCRIPTION OF THE INVENTION

Figure 1:
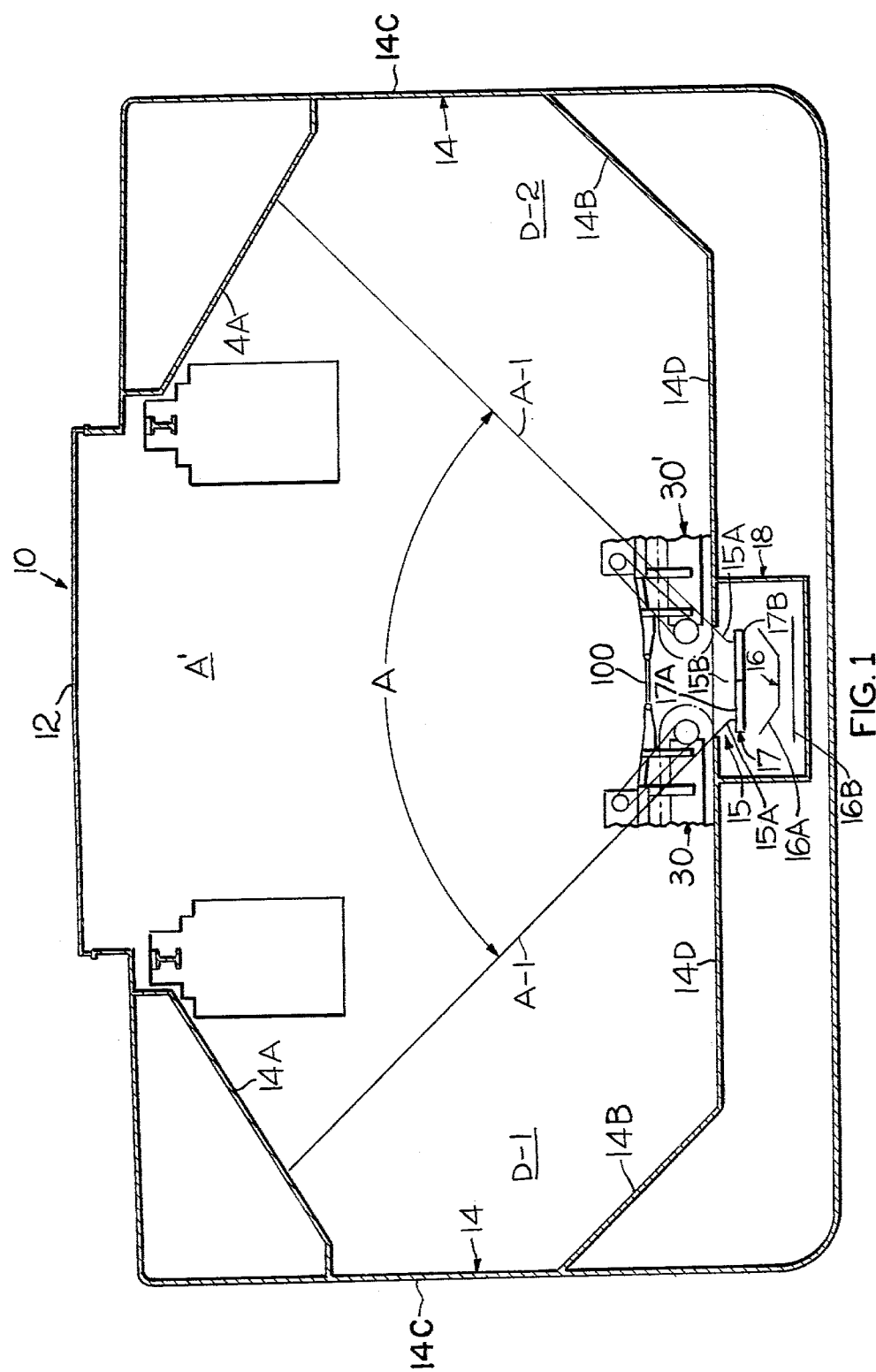
FIG. 1 is a view in transverse cross section of one of the ship holds showing the centrally located longitudinally extending unloading conveyor in underlying relation to the hold and also diagrammatically showing the region of the hold from which the bulk material flows by gravity to the unloading conveyor without assistance by a scraping means or the like; and also showing the two oppositely disposed "dead flow" regions in which the bulk material does not flow by gravity to the centrally located unloading conveyor.

Referring now to the drawings and more particularly to FIG. 1, there is shown the bulk cargo receiving region of a bulk cargo vessel adapted for carrying material such as coal, iron ore, grain, salt, crushed stone or the like. The bulk cargo receiving region is divided by bulkheads 40A, 40B into a plurality of holds generally indicated at 10 and specifically indicated at 10A, 10B, 10C. The opposite ends of the bulk cargo receiving region of the ship are bounded by walls 11A, 11B, one of which is the fore wall and the other of which is the aft wall. Each of the holds 10A, 10B, 10C is provided with one or more hatches 12 through which bulk material of the type just described may be introduced into the respective hold, and the interior of a given hold is bounded by oppositely disposed longitudinally extending sidewalls each respectively generally indicated at 14. Each sidewall 14 includes upper and lower tapered sidewall portions 14A and 14B, respectively, an intermediate straight wall portion 14C, and a flat floor portion 14D. The slope of each of the opposite lower wall portions 14B should be such that any bulk material within the hold and resting on sloping wall portion 14B will drop by gravity to floor portion 14D.

The plurality of holds 10 are discharged through a row of gated hoppers 15 extending downwardly from floor portion 14D of the holds. The row of hoppers 15 is centrally located relative to the transverse dimension of holds 10 and extends longitudinally of holds 10. Each hopper 15 is defined by a first pair of oppositely disposed sidewalls 15A which slope downwardly from hold floor portion 14D in a direction laterally of the hold and by a second pair of oppositely disposed sidewalls 15B which slope downwardly from hold floor portion 14D in a direction extending longitudinally of the hold. A gate 17 underlies each hopper and includes a pair of cooperating gate sections 17A and 17B which lie in a horizontal plane. Gate sections 17A and 17B are moved toward each other and in abutting relation to each other to form a closure for the bottom opening of the respective hopper 15 which is in overlying relation to the given gate 17; and gate sections 17A and 17B are moved away from each other to provide an opening through which the corresponding hoppers 15 may discharge onto tunnel belt conveyor 16.

The longitudinally extending endless unloading conveyor generally indicated at 16 is located in underlying relation to the longitudinally extending row of hoppers 15. Unloading conveyor 16 is positioned in a tunnel or channel 18 which extends longitudinally for substantially the entire length of the plurality of holds 10. The row of hoppers 15 and the unloading conveyor 16 in underlying relation to the row of hoppers are both substantially centrally located with respect to the transverse dimensions of hold 10. Suitable means (not shown) is provided for driving unloading conveyor 16. Unloading conveyor 16 includes an upper working run 16A which is supported by conventional troughing rolls (not shown). Conveyor 16 also includes a lower return run 16B. Tunnel belt conveyors such as that indicated at 16 which cooperate with ship holds having hoppered bottoms are well known in the art and are shown, for example, by the aforementioned U.S. Pat. No. 4,072,238 of Warren R. Vaughan. The following United States patents also show a ship hold or holds having hoppered bottoms which discharge the contents of the hold or holds onto an underlying unloading conveyor: U.S. Pat. Nos. 3,990,588 of David W. Dibben and 4,004,700 of Robert M. Empey.

When bulk material of the type hereinbefore described is contained within hold 10 and it is desired to unload or reclaim such bulk material by means of unloading conveyor 16, it has been found that the bulk material lying in a generally centrally located region A′ bounded by the arc A (FIG. 1) will discharge by gravity flow to unloading conveyor 16 without the assistance of any type of reclaiming apparatus in moving to unloading conveyor 16, permitting such material to be unloaded from hold 10 by means of unloading conveyor 16.

Referring to the schematic view shown in FIG. 1, it will be seen that the generally centrally located region A′ is bounded by the two oppositely disposed lines each indicated at A-1, each of which has an equal slope with respect to the horizontal plane. This slope may be, for example, in the range of 40°–50° with respect to the horizontal plane. The slope of the lines A-1 bounding the region A′ may vary depending upon the angle of response of the particular bulk cargo material received within hold 10.

However, bulk material lying beyond the centrally located region defined by the arc A in FIG. 1, namely the bulk material lying in the oppositely disposed regions of the hold indicated at D-1 and D-2, lies in what might be referred to as "dead flow" regions, and bulk material lying in regions D-1 and D-2 will not flow by gravity alone to the tunnel belt unloading conveyor 16 but needs some means, such as the reclaim scraper to be described, to assist in transferring the bulk material to unloading conveyor 16.

As best seen in FIGS. 2–8, inclusive, the bulk cargo reclaiming apparatus and system of the invention includes a reclaim scraper generally indicated at 30. As shown in FIG. 8, reclaim scraper 30 has a longitudinal dimension "L" and a lateral dimension "W". Longitudinal dimension "L" of the reclaim scraper is substantially greater than the lateral dimension "W" thereof.

As best seen in FIG. 2, what has been defined as the longitudinal dimension "L" of reclaim scraper 30 lies transverse of the longitudinal axis of the plurality of holds 10 during normal operation of the scraper. Reclaim scraper 30 is vertically suspended by means of a cable system generally indicated at 32 from a suspension head member generally indicated at 34 which is in turn suspended from a trolley assembly generally indicated at 36 which is movable along a longitudinally extending track generally indicated at 38 which extends longitudinally for substantially the entire length of the plurality of holds 10 and extends through openings or passages 42A, 42B in longitudinally spaced bulkheads 40A, 40B (FIG. 4). Bulkheads 40A, 40B separate the bulk cargo receiving region of the ship into separate holds 10A, 10B, 10C which may be used, if required, for loading different types of bulk material. The bulk cargo receiving region of the ship may be separated into a greater number of holds then the three holds 10A, 10B and 10C shown in FIG. 4 which are merely used for purposes of explanation.

A slewing drive gear motor generally indicated at 44 (FIG. 6) drives a pinion gear 45 which engages a ring gear 76 on the upper portion of suspension head 34 to permit rotating suspension head 34 through an angle of 90° from its normal position to permit movement of reclaim scraper 30 through the apertures or passages 42A, 42B in bulkheads 40A, 40B whereby to permit longitudinal movement of reclaim scraper 30 from one hold such as 10A to an adjacent hold such as 10B, as will be described in more detail hereinafter.

All of the foregoing various components of the system and apparatus which have been described in general terms thus far will be described in more detail hereinafter in the specification.

The reclaim scraper generally indicated at 30 comprises a suitable supporting framework 31 at one end of which a drive shaft 50 is suitably supported for rotation by bearings 51. At the opposite end of support framework 31 of reclaim scraper 30 a driven shaft 52 is supported for rotation by adjustable take-up bearings 53. Drive shaft 50 is rotatably driven by a drive mechanism generally indicated at 43 including a drive chain 55 driven by the output of a speed rotation device 58 which in turn is driven by a drive motor 56. Drive motor 56 and speed reduction device 58 are suitably mounted on framework 31 of reclaim scraper 30. Drive shaft 50 has mounted contiguous the opposite ends thereof sprocket members 50A, 50B, and driven shaft 52 has mounted contiguous the opposite ends thereof sprockets 52A, 52B.

A pair of laterally spaced chain members each indicated at 60 respectively engage drive sprocket 50A and driven sprocket 52A on one lateral side of reclaim scraper 30, and engage drive sprocket 50B and driven sprocket 52B on the opposite lateral side of reclaim scraper 30.

A plurality of scraper members or scraper flights generally indicated at 63 are attached at suitable longitudinally spaced intervals to the two laterally spaced chains 60 and move with chains 60 as chains 60 are rotated by the drive mechanism generally indicated at 43.

Each of the scraper flights generally indicated at 63 includes a scraper blade generally indicated at 63A having two blade sections 63A-1 and 63A-2 which diverge outwardly at a slight angle from each other from the midpoint of scraper blade 63A to provide a "scooper-like" contour which engages and pushes the bulk material being transferred to unloading conveyor 16. Scraper flight 63 also includes a "roof" portion 63B which overlies and is rigidly secured to scraper blade 63A as by welding and by reinforcing ribs 63D. Scraper blade 63A and the overlying roof portion 63B span the entire lateral distance between the two laterally spaced chains 60 and extend laterally a short distance on either end beyond the two chains 60. Each scraper flight 63 also includes a normally vertical end portion 63C at each lateral end of the scraper flight 63, each end portion 63C being secured to a chain link on the corresponding side of the scraper flight, whereby to secure the scraper flight 63 to the oppositely disposed chains 60.

Intermediate the length of reclaim scraper 30, a pair of oppositely disposed laterally spaced yoke members each generally indicated at 62 are suitably secured to framework 31 of the reclaim scraper. The two oppositely disposed yoke members support pulley shaft 64. On one end of pulley shaft 64, two pulleys 66A, 66B are mounted in side-by-side relation, and at the opposite end of pulley shaft 64, two pulleys 66C, 66D are mounted in side-by-side relation. Pulleys 66A, 66B, 66C, 66D form part of the cable hoist arrangement by means of which reclaim scraper 30 is raised and lowered, as will be described hereinafter more fully. It might be noted that in this specification, for simplicity of description, the term "reclaim scraper" is intended to include the entire suspended assembly shown in FIG. 9 including everything which is suspended by cable system 32. Shaft 64 is also located as to lie substantially in the plane of the center of gravity of reclaim scraper 30.

At the left-hand portion of reclaim scraper 30 relative to the views of FIGS. 8 and 9, a grooved drum 68 is suitably mounted. Cables 32A and 32B of the cable hoist system are wound onto or unwound from grooved drum 68 to control the vertical raising or lowering movement of reclaim scraper 30 as will be described more fully hereinafter. Grooved drum 68 is suitably driven by the output shaft of a speed reducing device 72 which in turn is driven by a suitable electric motor 70.

Figure 7:
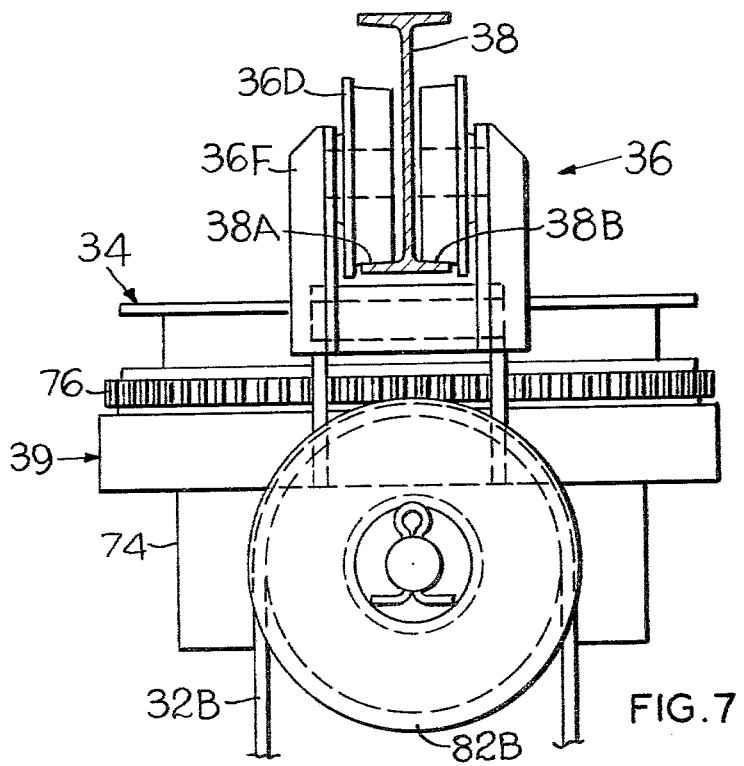
FIG. 7 is an end view of the apparatus shown in FIG. 5.

The suspension head generally indicated at 34 which is supported for longitudinal traversing movement by trolley assembly 36 (FIG. 5) comprises a central cylindrical hub member 74, and a ring gear 76 is fixed to the radially outer surface of cylindrical hub member 74. Trolley assembly 36 comprises four pairs of wheels 36A, 36B, 36C and 36D which are mounted for longitudinal traversing movement along a track defined by an I-beam 38. One wheel of each pair of wheels, such as one of the wheels of the pair 36A, for example, rides on flange 38A of the "I-beam" track 38 while the other wheel of each pair of wheels rides on the opposite flange 38B of I-beam 38 (FIG. 7). The first and second pairs of wheels 36A, 36B are joined together by oppositely disposed yoke members 36E, and the third and fourth pairs of wheels 36C and 36D are joined together by a similar pair of oppositely disposed yoke members 36F. Link means 36G connects each pair of yoke members 36E-36F together whereby all four pairs of wheels 36A, 36B, 36C, 36D shown in the view of FIG. 5 move together. Each pair of yoke members 36E, 36F supports a corresponding pair of downwardly depending arms 37 which, in turn, support an annular bearing 39 which underlies ring gear 76. Bearing 39 supports suspension head 34, and more particularly cylindrical hub 74 of suspension head 34, for a limited rotary angular movement such as a 90° rotary movement during the slewing operation to be described hereinafter.

The gear motor 44 (FIG. 6) used in connection with the 90° slewing operation is suitably supported contiguous ring gear 76 by trolley assembly 36. Gear motor 44 is connected to electrical power through a suitable control device and drives a pinion gear 45 which meshes with the gear teeth on ring gear 76 mounted on suspension head 34 to rotate suspension head 34 and reclaim scraper 30 suspended from suspension head 34 through a 90° angle in a horizontal plane preliminary to moving reclaim scraper 30 through an aperture such as 42A or 42B (FIG. 4) through a bulkhead such as 40A, 40B from one hold to an adjacent hold.

Suspension head 34 has fixed thereto a hollow sleeve-like member 78 which projects equal distances on opposite sides of cylindrical hub member 74 and which serves as a support for oppositely disposed stub shafts 80A and 80B on which the oppositely disposed pulley sheaves 82A and 82B are mounted. Pulley sheaves 82A, 82B also form part of the cable hoist system by means of which reclaim scraper 30 is raised and lowered, as will be described more fully hereinafter.

A drive mechanism to provide the longitudinal traversing movement of reclaim scraper 30 lengthwise of hold 10 is generally indicated at 84 (FIG. 4). Traversing drive mechanism 84 is mounted on the ship deck and includes two winches 84A, 84B interconnected to each other by a drive chain 84C. A reversible motor 88 drives both of the winches 84A, 84B simultaneously due to the chain 84 connecting the two winches.

When reversible motor 88 is driven in one direction, one of the winches, such as 84A, is rotated in such a direction as to wind up its corresponding cable 90 while the other of the winches 84B is rotated in such a direction as to pay out its corresponding cable 92.

Winch 84A is connected by cable 90 to yoke 36F of trolley assembly 36 and winch 84B is connected by cable 92 to yoke 36E of trolley assembly 36. When winch 84A is rotated to wind up cable 90, trolley assembly 36 is pulled to the right relative to the views of FIGS. 4 and 5 to cause reclaim scraper 30 to traverse from left to right relative to the view of FIGS. 4 and 5 to reclaim bulk material along its path. At the completion of the left-to-right traversing movement just described, the reclaim scraper 30 is lowered by the cable hoist system which includes cables 32A, 32B an appropriate distance for another horizontal pass (this time in a right-to-left direction relative to FIGS. 4 and 5). To cause the right-to-left movement, motor 88 is reversed and winch 84B is then rotated to wind up cable 92 thereon, and winch 84A is rotated to pay out cable 90, causing trolley assembly 36, and hence reclaim scraper 30 supported by trolley assembly 36, to be pulled from right to left, relative to the views of FIGS. 4 and 5. During this right-to-left movement, reclaim scraper 30 reclaims the bulk material at the new level to which it has been dropped.

Figure 15:
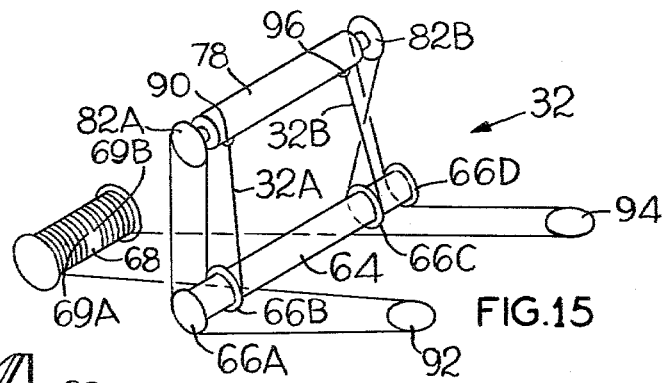
FIG. 15 is a schematic diagram showing the cable hoist arrangement which is used for raising and lowering the reclaim scraper.
Figure 10:
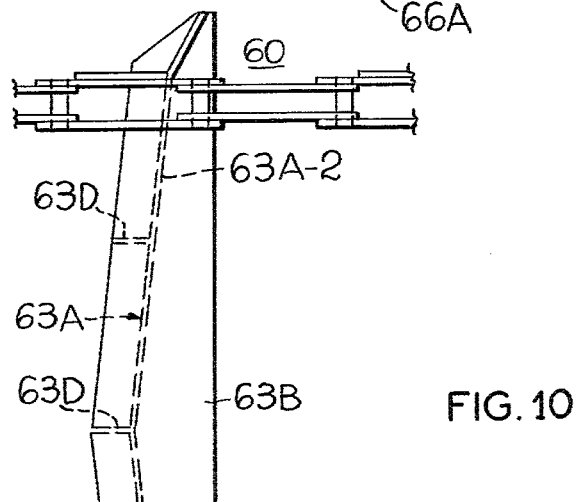
FIG. 10 is a detailed top plan view of one of the flights of the reclaim scraper showing its attachment to the oppositely disposed drive chains of the reclaim scraper.
Figure 11:
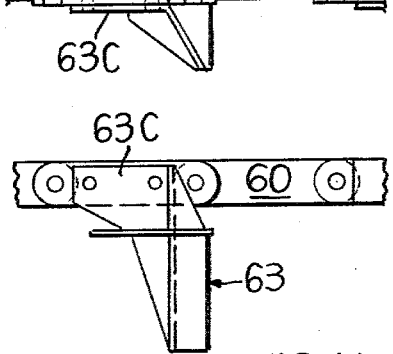
FIG. 11 is a view of the reclaim scraper flight as viewed from the left-hand end of FIG. 10.
Figure 12:
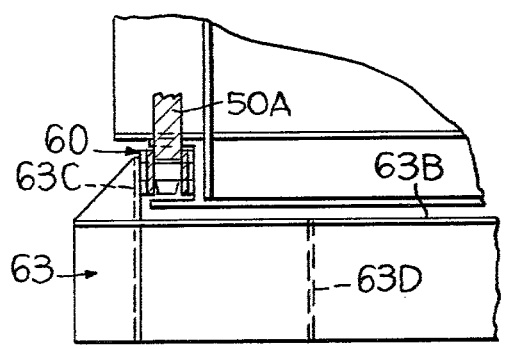
FIG. 12 is a fragmentary view in front elevation of the flight of the reclaim scraper and of one of the drive chains of FIG. 10.

The cable system 32 which is used for raising and lowering reclaim scraper 30 is diagrammatically shown in FIG. 15. The cable system 32 utilizes two separate cables 32A and 32B which are wound onto grooved drum 68 to raise reclaim scraper 30 and which are unwound from grooved drum 68 to lower reclaim scraper 30. It will be seen that one end of cable 32A is anchored at point 90 to the left-hand end of sleeve 78 of suspension head 34 (as viewed in FIGS. 5 and 15). Cable 32A then passes downwardly around lower pulley sheave 66B on pulley shaft 64 supported by yoke 62 on reclaim scraper 30, thence upwardly around sheave 82A of suspension head 34, thence downwardly around sheave 66A supported by yoke structure 62 on reclaim scraper 30. Cable 32A then passes around horizontal sheave 92 mounted on reclaim scraper 30, and then passes to engage the left-hand portion of grooved drum 68 (relative to the view in FIGS. 8 and 15), and when fully wound the end of cable 32A being anchored at point 69A on the axially central portion of drum 68.

Figure 5:
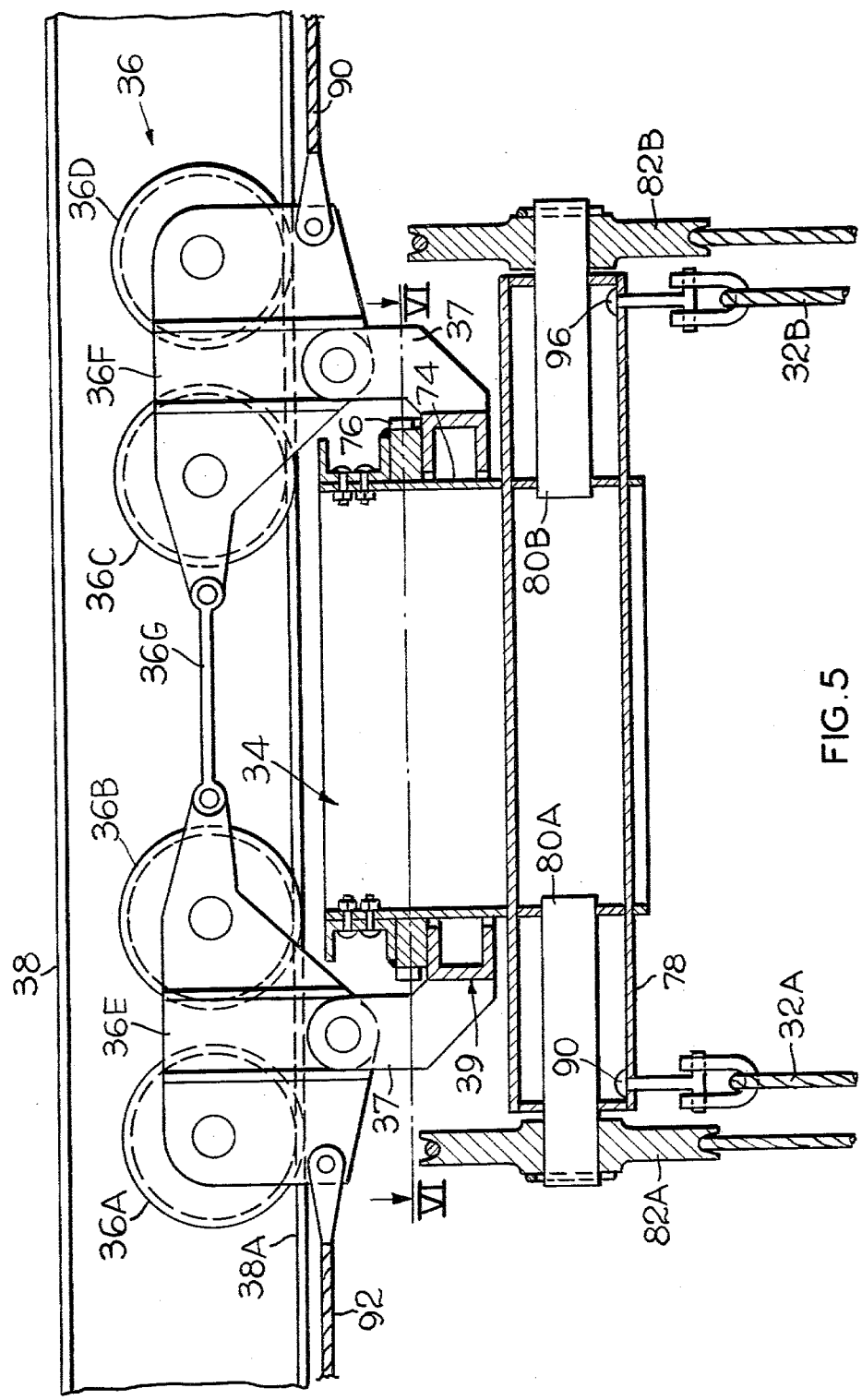
FIG. 5 is an enlarged view partially in vertical elevation and partially in vertical section showing details of the suspension head by means of which the reclaim scraper is suspended and also showing the trolley and track arrangement which permits longitudinal traversing movement of the suspension head.
Figure 6:
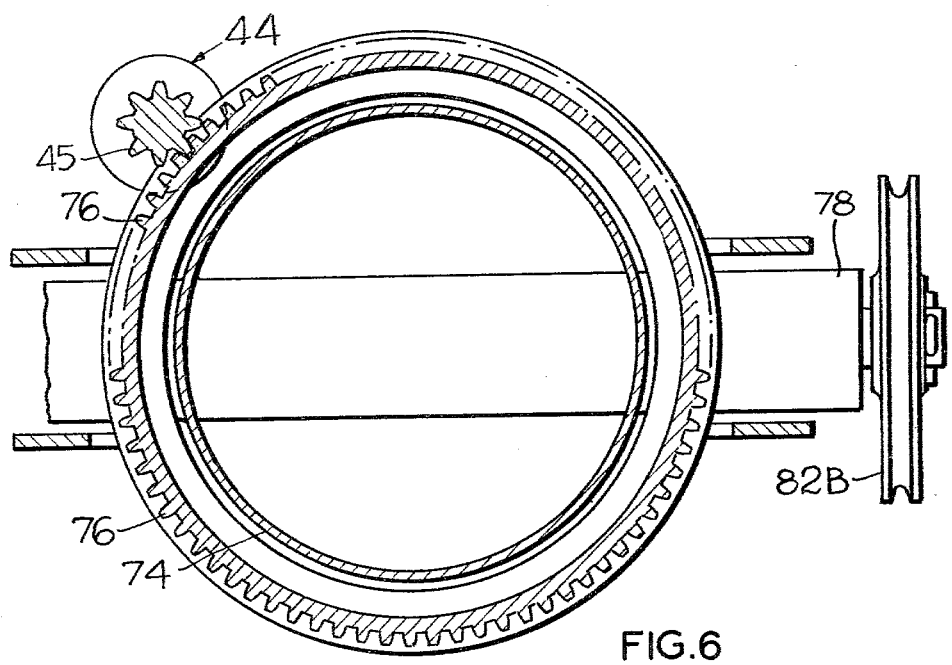
FIG. 6 is a view taken along the line VI—VI of FIG. 5 showing the "slewing" drive mechanism which permits a 90° turning movement of the suspension head and of the reclaim scraper suspended therefrom to permit moving the reclaim scraper through an aperture or passage in a bulkhead from one hold to an adjacent hold.

The second cable 32B of cable system 32 has one of its ends anchored at point 96 near the right-hand end of sleeve 78 of suspension head 34 (relative to the views of FIGS. 5 and 15). Cable 32B then passes downwardly around pulley 66C carried by shaft 64 on reclaim scraper 30, cable 32B then passing upwardly and passing around pulley sheave 82B carried by suspension head 34; cable 32B then passes downwardly and around pulley sheave 66D carried by shaft 64 of reclaim scraper 3D, cable 32B thence passing around horizontal sheave 94, cable 32B then passing to grooved drum 68, and is wound around drum 68, from the right-hand end of drum 68 relative to the view of FIG. 15 (when fully wound) toward the axially central region of drum 68, with the remaining end of cable 32B being anchored at point 69B in the axially central region of drum 68.

Two reclaim scraper systems such as that hereinbefore described are provided in the hold 10, each including a reclaim scraper suspended for vertical movement by a suspension head and cable system, both the suspension head and cable system being supported by a trolley which is traversible longitudinally of the hold along a track; and the suspension head of each reclaim scraper system having means for "slewing" the reclaim scraper through an angle of 90° to permit passing through apertures such as 42A, 42B in bulkheads 40A, 40B (FIG. 4) from one hold to an adjacent hold. Reclaim scraper 30 which has been described and shown in detail reclaims or removes bulk material from "dead flow" region D-1 of the hold of FIG. 1; while a similar reclaim scraper 30' operates in the right-hand side of hold 10 with respect to the view shown in FIG. 1 and reclaims or removes bulk material from the dead flow region indicated at D-2 in the hold of FIG. 1. Each of the reclaim scrapers 30 and 30' is the same and a description and illustration of reclaim scraper 30 and its cable hoist system, longitudinal traversing arrangement, and 90° slewing arrangement should suffice for both reclaim scrapers 30 and 30'. The two reclaim scrapers 30 and 30' are preferably connected together during normal operation by means of two bars or links such as those indicated at 100. Each link 100 is supported at its opposite ends on the respective reclaim scrapers 30 and 30' by universal bearings which permit some movement of the two reclaim scrapers 30 and 30' with respect to each other and yet constrain the two reclaim scrapers to move substantially in unison with each other during the vertical up and down movement of the scrapers and also during the longitudinal traversing movement of the scrapers. However, when reclaim scrapers 30 and 30' are to be moved from one hold to another through the aperture or passage such as 42A in bulkhead 40A, which involves rotating the scrapers in a horizontal plane to a 90° angle relative to their normal orientation, it is necessary to disconnect the link members 100 from one of the two reclaim scrapers 30 and 30' so that the two reclaim scrapers 30 and 30' may then independently move through the bulkhead such as 40A into the next hold 10. After this movement of reclaim scrapers 30 and 30' through the bulkhead has been completed, the two reclaim scrapers 30 and 30' should then be reconnected by means of the links 100.

The connection links or bars 100 between the two reclaim scrapers 30 and 30' tend to stabilize the two reclaim scrapers 30 and 30' and to minimize swinging or undesirable tilting movements of the scrapers.

DESCRIPTION OF OPERATION

Assume, for purposes of explanation, that the bulk cargo reclaiming operation to be described takes place in hold 10B (FIG. 4). Assume also that the bulk cargo material in region A' of hold 10B as illustrated in the diagrammatic view of FIG. 1 has been completely removed due to this material having dropped down through appropriate open hopper gates 17 to unloading conveyor 16 by gravity flow, and that the bulk material in "dead flow" regions D-1 and D-2 which extend longitudinally of the hold for substantially the entire length thereof is still to be reclaimed or removed.

When the reclaiming operation is to begin on the bulk material in the "dead flow" regions D-1 and D-2, each of the reclaim scrapers 30 and 30' will be essentially at the "parked" position indicated at P in the view of FIG. 2, and appropriate hopper gates 17 will be open.

In describing the operation, the operation of reclaim scraper 30 will be described, it being understood that reclaim scraper 30' operates in a similar manner to reclaim scraper 30. Suitable electrical controls may be provided to provide either independent control of each reclaim scraper system, or to provide joint control of both reclaim scraper systems.

To initiate the reclaiming operation, electric motor 70 which drives grooved drum 68 of cable hoist system through variable speed drive 72 is energized to cause grooved drum 68 to rotate in a direction which unwinds cables 32A and 32B to lower reclaim scraper 30 downwardly from "park position" P until the reclaim scraper has moved down into reclaiming engagement with the upper level of the stockpile of bulk material in "dead flow" region D-1, such as to the position of reclaim scraper 30 indicated at L-1 in the view of FIG. 2. Electric motor 56 which drives chains 60 through variable speed drive 58 is activated to rotate chains 60 in a counterclockwise direction with respect to the views shown in FIGS. 8 and 9, whereby the lower run of chains 60 moves scrapers 63 in a direction toward the longitudinal centerline of hold 10. During their movement, scrapers 63 engage the bulk material in the dead flow region D-1 (FIG. 1) and move it toward the central region of the hold where the material drops down onto unloading conveyor 16 and is thereby removed from the hold.

Motor 88 is energized to rotate in such a direction that winch 84A which winds traverse cable 90 to cause trolley 36 to move from left to right with respect to the views of FIGS. 4 and 5 is activated and slowly pulls suspension head 34 and consequently cable system 32 and reclaim scraper 30 supported by trolley 36 lengthwise of hold 10B until reclaim scraper 30 has substantially abutted against the left-hand side relative to the view shown in FIG. 4 of bulkhead 40B which is the limit of the travel of the reclaim scraper 30 in hold 10B in which reclaim scraper 30 is assumed to be operating. During the movement of trolley 36 from left to right in hold 10B as just described, winch 84B is being rotated by motor 88 in such a direction as to "pay out" cable 92.

When reclaim scraper 30 has completed a horizontal pass along the entire length of hold 10B moving from left to right, for example, with respect to the schematic diagram of FIG. 4, motor 70 (FIGS. 8 and 9) is actuated to again cause rotation of grooved drum 68 in a direction which unwinds more of cables 32A, 32B to thereby lower reclaim scraper 30 a predetermined distance such that scraper 30 can reclaim another "layer" of bulk material. A second horizontal pass is then made longitudinally to hold 10B, this time moving reclaim scraper 30 from right to left in hold 10B relative to the schematic diagram of FIG. 4. The traversing movement from right to left is accomplished by reversing the direction of rotation of motor 88 to cause winch 84B to wind up traversing cable 92 on winch 84B and to cause winch 84A to "pay out" cable 90.

After reclaim scraper 30 has completed a second horizontal pass as just described, the level of reclaim scraper 30 is again lowered by actuation of grooved drum 68 as previously described, as, for example, to the level L-3 as shown in FIG. 2, and a third horizontal pass is made longitudinally of hold 10B, this time from left to right, in the manner previously described. In the reclaiming operation, the "dead flow" regions D-1 and D-2 are reclaimed by each respective reclaim scraper 30 and 30' in a plurality of horizontal passes lengthwise of the hold 10B, with the respective reclaim scrapers 30 and 30' being lowered by their grooved drum 68 and by their associated cable hoist system at the end of each horizontal pass to an appropriate lower level for the next horizontal pass lengthwise of the hold.

When all of the bulk material has been removed from the given hold (assumed to be hold 10B of FIG. 4), the reclaim scraper will be at the position L-4 shown in full line in the view of FIG. 2 in which it substantially seats on the bottom floor surface of the hold. If there is bulk material in the "dead flow" regions of an adjacent hold, such as hold 10C of FIG. 4, which must be removed, reclaim scrapers 30 and 30' are moved to adjacent hold 10C in the manner which will now be described.

The connecting links 100 which had connected the two reclaim scrapers 30 and 30' during the reclaiming oeration in hold 10B are detached from one of the reclaim scrapers so that the two reclaim scrapers can be independently moved through bulkhead 40B and into hold 10C. Grooved drum 68 is rotated by drive motor 70 and by variable speed drive 72 in a direction such as to raise reclaim scraper 30 to substantially the "parked" position P shown by dotted line in FIG. 2 where it will be at the same level as the opening or passage 42B in bulkhead 40B between holds 10B and 10C. Preparatory to moving through bulkhead 40B into the adjacent hold 10C, the reclaim scraper should be positioned a sufficient longitudinal distance away from bulkhead 40B before beginning to rotate the reclaim scraper 30 through a 90° angle, in order to provide sufficient clearance for the reclaim scraper to rotate through the 90° angle without hitting up against the bulkhead during 90° rotation of the reclaim scraper.

With reclaim scraper 30 properly longitudinally spaced from bulkhead 40B to permit 90° rotation of the reclaim scraper, and with the reclaim scraper at the proper vertical height for movement through aperture 42B in bulkhead 40B, slewing drive gear motor 44 is energized to cause pinion gear 45 to drive ring gear 76 attached to suspension head 34 to cause suspension head 34 to rotate through an angle of 90° from the parked position shown in FIG. 2. The rotation of suspension head 34 causes cable system 32 and the suspended reclaim scraper 30 to rotate 90° from the parked position shown in FIG. 2 whereby to align reclaim scraper 30 longitudinally with aperture 42B in bulkhead 40B. Winch 84A is then actuated to cause trolley 36 and suspension head 34 to move along track 38 through aperture 42B in bulkhead 40B, and thus also causing reclaim scraper 30 to move longitudinally through aperture 42B in bulkhead 40B and to pass into the adjacent hold 10C (see FIGS. 13 and 14).

Figure 13:
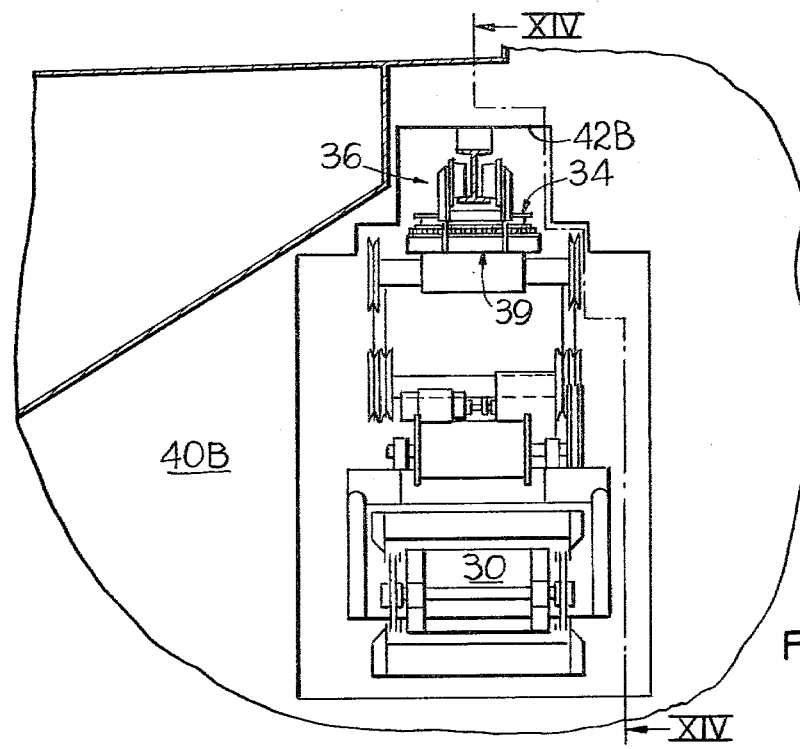
FIG. 13 is a transverse view of the ship hold showing the reclaim scraper rotated 90° from its normal operating position and passing through the passage in a bulkhead from one hold to an adjacent hold on the opposite side of the bulkhead.
Figure 14:
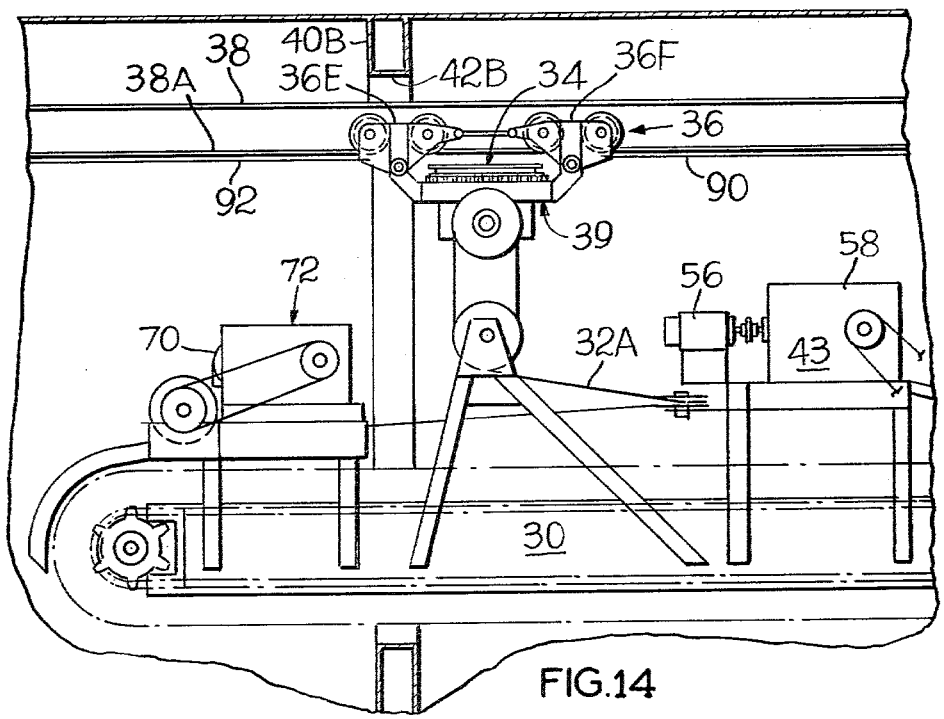
FIG. 14 is a view in longitudinal section taken along line XIV—XIV of FIG. 13.

When reclaim scraper 30 has completely moved into the adjacent hold 10C, it is moved longitudinally far enough along hold 10C to permit 90° rotation of the scraper 30 from the longitudinally oriented position of the reclaim scraper shown in FIGS. 13 and 14 in which it was moved through the bulkhead, back to the normal operating position in which the reclaim scraper extends in a direction laterally of the longitudinal axis of the hold. When both of the reclaim scrapers 30 and 30' have been moved into the adjacent hold 10C and have been rotated back to their normal operating position such as that shown in FIGS. 1 and 2, the two reclaim scrapers may again be connected by means of connecting links 100 as previously described.

From the foregoing detailed description of the invention it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a bulk cargo ship having a bulk cargo receiving region, said bulk cargo receiving region being separated into adjacent holds by a bulkhead extending transverse of the longitudinal axis of said holds, said bulkhead having an aperture through the upper portion of said bulkhead, a material handling system for continuous unloading of bulk cargo from said holds comprising an unloading conveyor positioned in underlying relation to said holds and adapted to move in a direction lengthwise of said holds, discharge passage means at the bottom of said holds through which bulk material may discharge onto said unloading conveyor, said material handling system further comprising means for reclaiming bulk material from said holds including a reclaim scraper comprising movable bulk material transfer means adapted to engage the bulk material and to transfer the bulk material to said discharge passage means, said reclaim scraper having a longitudinal dimension and a transverse dimension, with said longitudinal dimension being substantially greater than said transverse dimension, said longitudinal dimension being greater than the dimension of said aperture in said bulkhead, said transverse dimension being less than the dimension of said aperture in said bulkhead, said scraper when in normal operation being positioned with the longitudinal dimension thereof lying substantially transverse of the longitudinal axis of the plurality of holds and substantially parallel to the plane of said bulkhead, means for driving said movable bulk material transfer means to effect the transfer of said bulk material, track means mounted contiguous the upper end of said holds and extending longitudinally of said holds and through said aperture in said bulkhead, a trolley movable along said track means lengthwise of said holds, a suspension head carried by said trolley, cable hoist means interconnecting said suspension head and said reclaim scraper and operable to lower said reclaim scraper into reclaiming relation to bulk material in the hold and for raising said reclaim scraper, said suspension head being mounted for rotation in a horizontal plane through a predetermined angle about a vertical axis while supporting said reclaim scraper, whereby to orient said reclaim scraper with the longitudinal dimension of said reclaim scraper substantially parallel to the longitudinal axis of the plurality of holds and thus properly positioned for passage through said aperture in said bulkhead, means supported by said trolley for rotating said suspension head through said predetermined angle, and means for moving said trolley along said track, whereby to move said reclaim scraper lengthwise of said hold in reclaiming relation to bulk material along the length of said hold, and whereby to move said reclaim scraper through said aperture in said bulkhead from one hold to an adjacent hold.

2. The combination as defined in claim 1 in which said discharge passage means comprises a plurality of hoppers positioned along the length of said hold and gates associated with the respective hoppers for controlling material flow from said hoppers to said unloading conveyor.

3. The combination as defined in claim 1 in which said movable bulk material transfer means comprises endless chain means, and a plurality of scraper flights mounted in spaced relation to each other along said endless chain means.

4. The combination as defined in claim 1 in which said unloading conveyor is located substantially centrally of the transverse dimension of said hold whereby bulk material lying in a first region of said hold which is centrally located relative to the transverse dimension of said hold will discharge by gravity to said unloading conveyor without the assistance of other means, said means for reclaiming being operable to reclaim the rest of the material in said hold which lies in oppositely-disposed normally "dead flow" regions on opposite sides of said first region, said means for reclaiming comprising said first mentioned scraper and a second reclaim scraper respectively positioned on opposite lateral sides of said unloading conveyor, each of said reclaim scrapers being adapted to reclaim bulk material from a corresponding one of said "dead flow" regions and to transfer said material to said unloading conveyor.

5. The combination as defined in claim 4, wherein said track means comprise first and second track means respectively corresponding to said first and to said second reclaim scraper, said first and said second track means each extending longitudinally of said hold and being respectively mounted contiguous the upper end of said hold on opposite lateral sides of said unloading conveyor, first and second traversible support means mounted for translatory movement along the respective track means, said cable hoist means comprising a separate cable hoist means interconnecting each of said support means and the corresponding reclaim scraper and operable to lower said corresponding reclaim scraper into reclaiming relation to bulk material in the corresponding one of said "dead flow" regions and for raising said corresponding reclaim scraper, and means for moving each traversible support means along its respective track means, whereby to move each corresponding reclaim scraper lengthwise of said hold to permit reclaiming of bulk material from a corresponding "dead flow" region.

6. The combination as defined in claim 1, comprising motor means supported by said trolley contiguous said suspension head, first gear means driven by said motor means, second gear means mounted on said suspension head, whereby driving engagement of said first gear means with said second gear means is effective to impart rotation to said suspension head through said predetermined angle.

7. The combination as defined in claim 1 in which said cable hoist means comprises a rotatable drum mounted on said reclaim scraper, cable means connected to said drum and to said suspension head, and means for rotating said drum in one direction to wind said cable means on said drum whereby to raise said reclaim scraper, said drum being rotatable in the opposite direction whereby to unwind said cable means to lower said reclaim scraper.

* * * * *